US010895895B2

United States Patent
Pabbisetty et al.

(10) Patent No.: US 10,895,895 B2
(45) Date of Patent: Jan. 19, 2021

(54) ELECTRONIC APPARATUS, MEASUREMENT APPARATUS, AND METHOD

(71) Applicant: KABUSHIKI KAISHA TOSHIBA, Tokyo (JP)

(72) Inventors: Gurusanthosh Pabbisetty, Kanagawa (JP); Kentaro Taniguchi, Kanagawa (JP); Tomoya Tandai, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 15 days.

(21) Appl. No.: 16/294,105

(22) Filed: Mar. 6, 2019

(65) Prior Publication Data

US 2020/0057474 A1 Feb. 20, 2020

(30) Foreign Application Priority Data

Aug. 20, 2018 (JP) ................. 2018-154099

(51) Int. Cl.
*H02J 50/23* (2016.01)
*H02J 50/40* (2016.01)
*H02J 50/80* (2016.01)
*H02J 50/90* (2016.01)
*G06F 1/16* (2006.01)

(52) U.S. Cl.
CPC ............ *G06F 1/1683* (2013.01); *H02J 50/23* (2016.02); *H02J 50/40* (2016.02); *H02J 50/80* (2016.02); *H02J 50/90* (2016.02)

(58) Field of Classification Search
CPC .. H02J 50/20; H02J 50/23; H02J 50/40; H02J 50/80; H02J 50/90
See application file for complete search history.

(56) References Cited

U.S. PATENT DOCUMENTS

| | | | |
|---|---|---|---|
| 9,948,135 B2 | 4/2018 | Leabman et al. | |
| 9,966,765 B1* | 5/2018 | Leabman | H02J 50/23 |
| 10,326,308 B2* | 6/2019 | Nagamine | H02J 50/12 |
| 2010/0264746 A1* | 10/2010 | Kazama | H04W 52/18 |
| | | | 307/104 |
| 2012/0149307 A1* | 6/2012 | Terada | H02J 7/025 |
| | | | 455/66.1 |
| 2012/0205988 A1* | 8/2012 | Tanabe | H02J 50/40 |
| | | | 307/104 |
| 2012/0309308 A1* | 12/2012 | Kim | H02J 50/80 |
| | | | 455/41.1 |
| 2014/0223204 A1* | 8/2014 | Haraguchi | G06F 1/26 |
| | | | 713/300 |
| 2015/0365138 A1 | 12/2015 | Miller et al. | |
| 2017/0288738 A1* | 10/2017 | Lee | H04W 52/42 |
| 2018/0287429 A1* | 10/2018 | Yamamoto | H02J 50/23 |

* cited by examiner

*Primary Examiner* — Levi Gannon
(74) *Attorney, Agent, or Firm* — Holtz, Holtz & Volek PC

(57) ABSTRACT

According to one embodiment, an electronic apparatus communicable with a measurement apparatus includes a power supplier and control circuitry. The power supplier is configured to supply power by an electromagnetic wave. The control circuitry is configured to receive first information on a wireless signal measured by the measurement apparatus and control the electromagnetic wave for power supply based on both the first information and a position of the measurement apparatus.

16 Claims, 11 Drawing Sheets

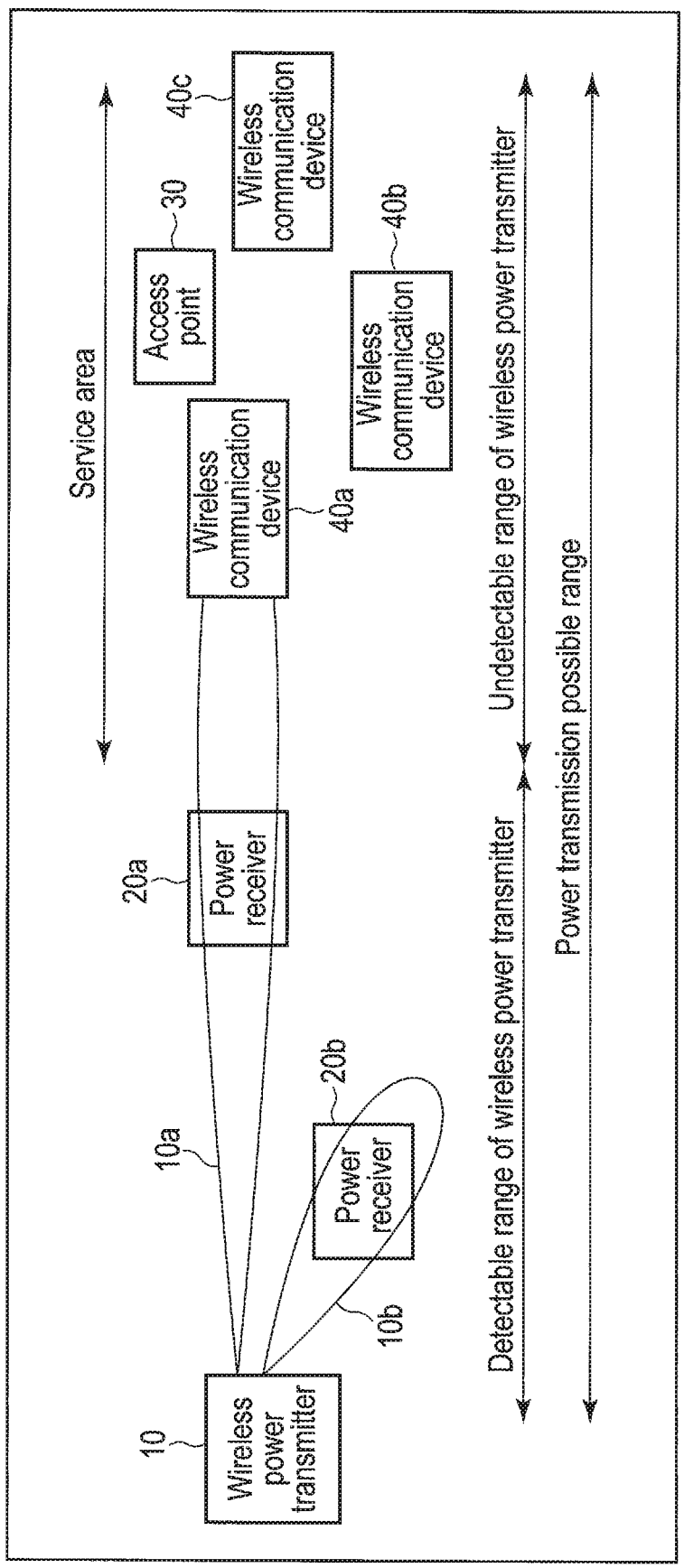
F I G. 1

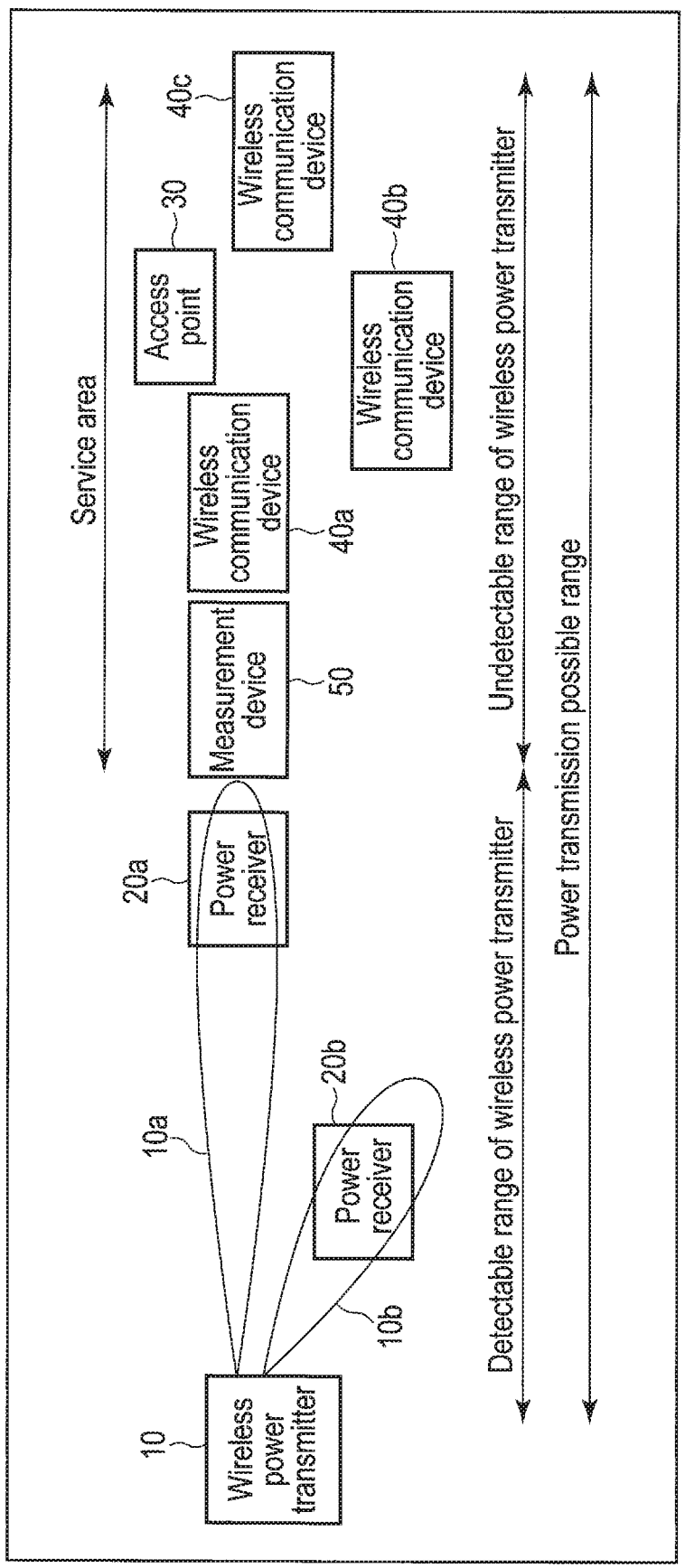
F I G. 2

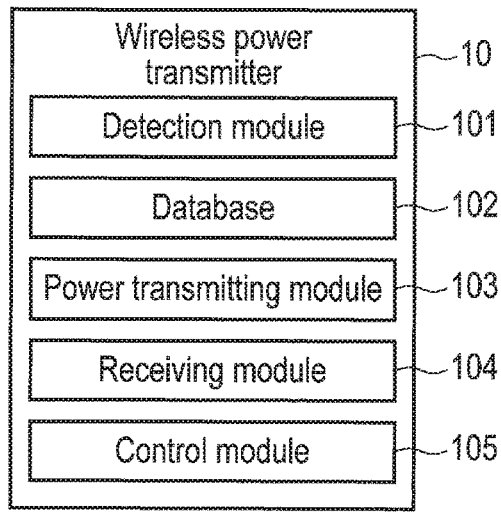
FIG. 5
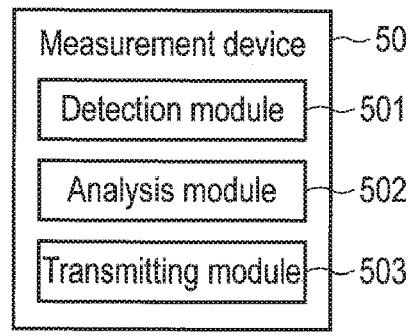
FIG. 6
FIG. 7

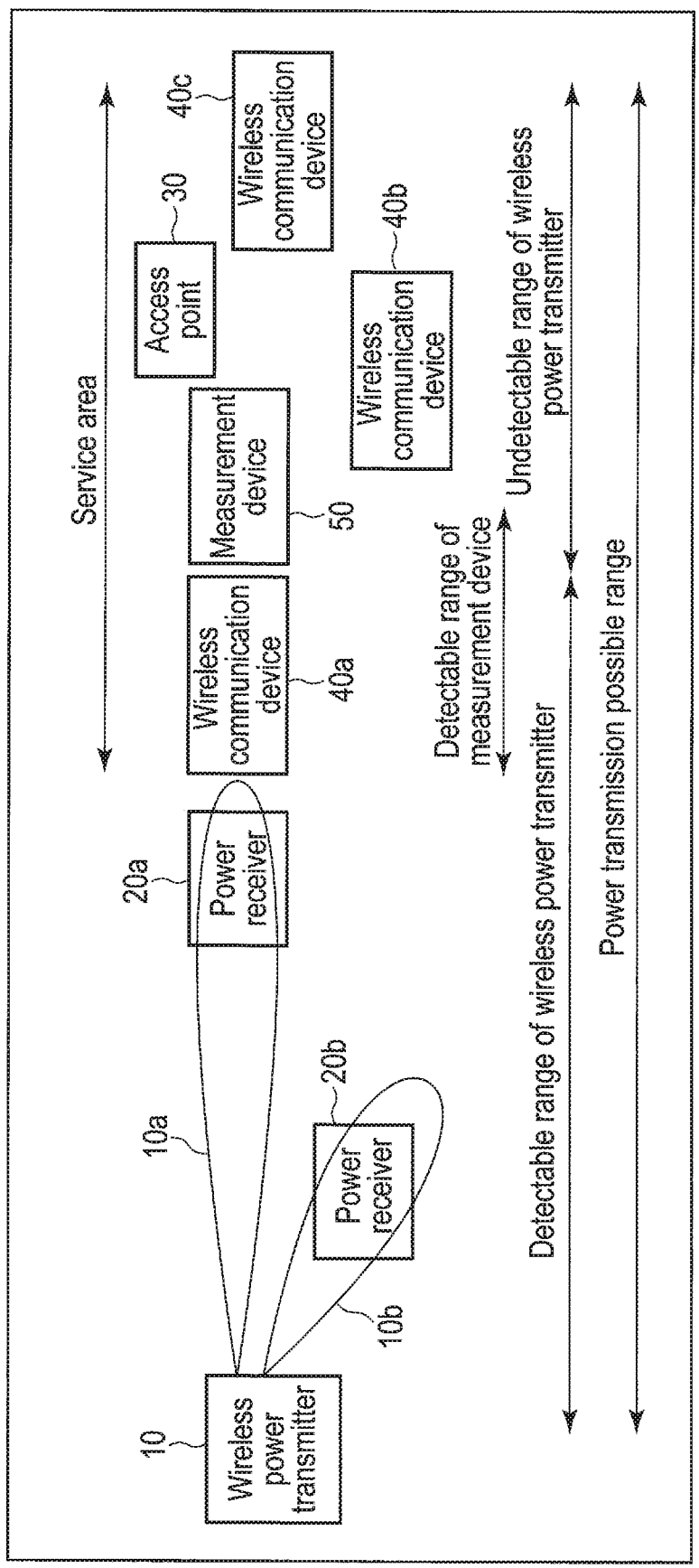
F I G. 8

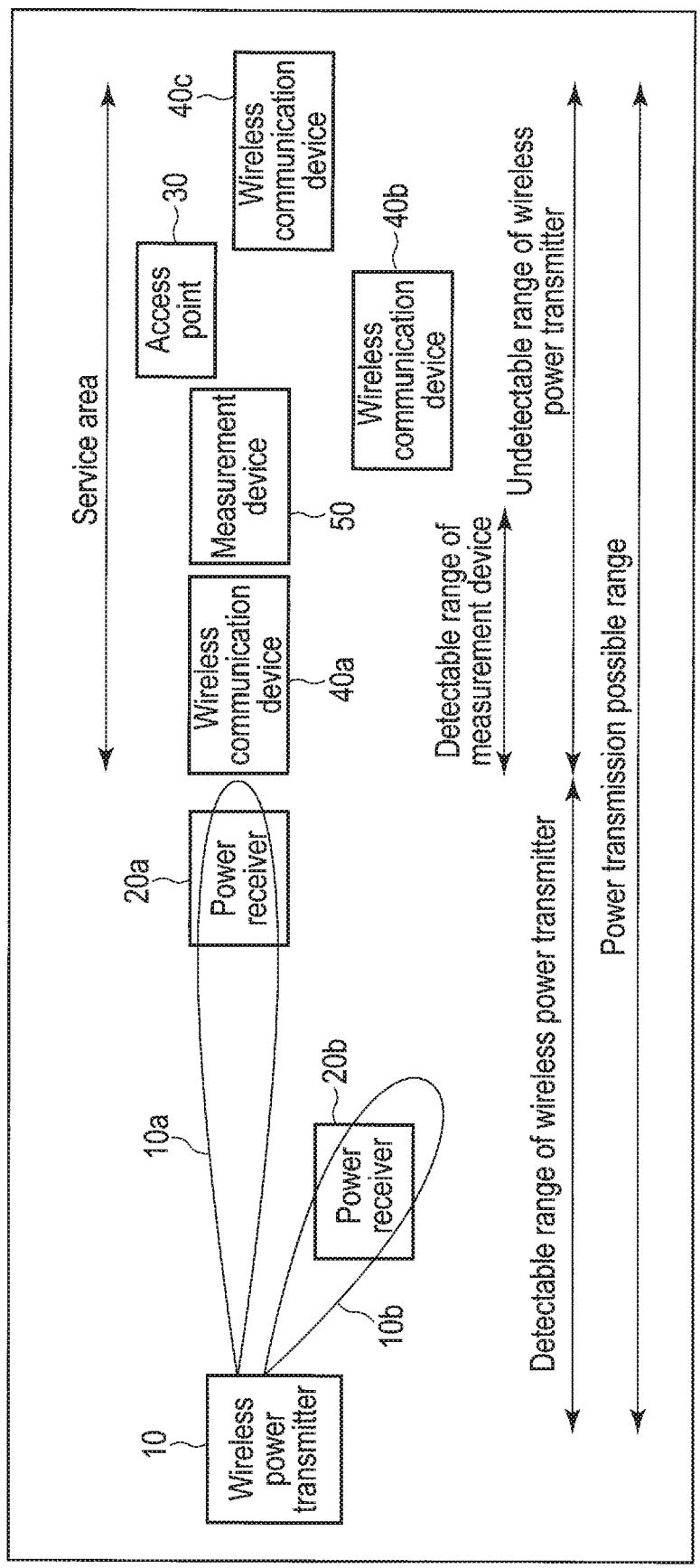
F I G. 9

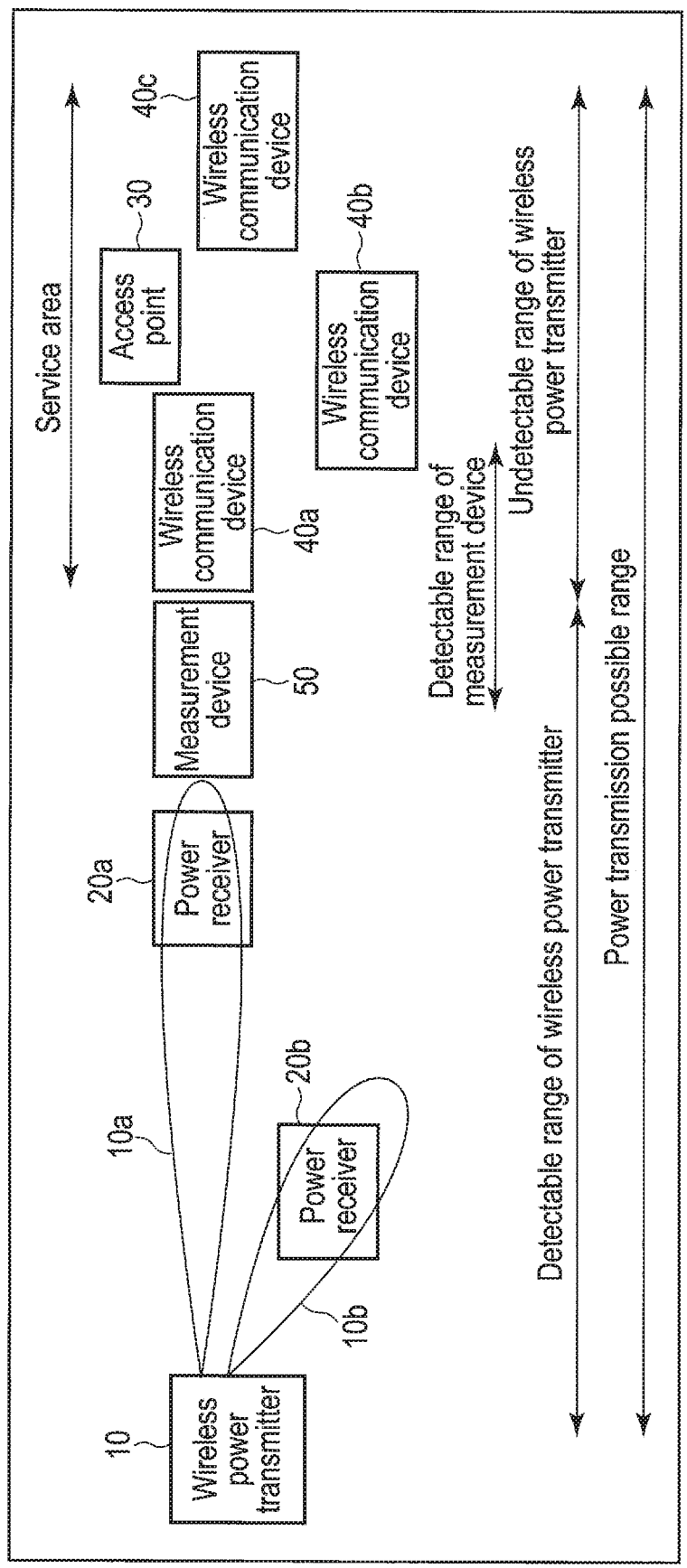
F I G. 10

ELECTRONIC APPARATUS, MEASUREMENT APPARATUS, AND METHOD

CROSS-REFERENCE TO RELATED APPLICATIONS

This application is based upon and claims the benefit of priority from Japanese Patent Application No. 2018-154099, filed Aug. 20, 2018, the entire contents of which are incorporated herein by reference.

FIELD

Embodiments described herein relate generally to an electronic apparatus, a measurement apparatus, and a method.

BACKGROUND

In recent years, attention has been paid to technologies capable of transmitting (supplying) power to a power receiver by transmitting an electromagnetic wave for power supply from an electronic device called a wireless power transmitter (power transmitter).

These technologies are expected to dramatically improve convenience since there are no physical constraints in contrast with when power is supplied to the electronic device in a wired manner as in the past.

By the way, in order to efficiently transmit power to the power receiver, it is necessary for the wireless power transmitter to transmit an electromagnetic wave having a high power level.

However, when the electromagnetic wave having a high power level is transmitted, the electromagnetic wave may cause interference with other wireless communication systems and deteriorate communication situations in the wireless communication system.

BRIEF DESCRIPTION OF THE DRAWINGS

FIG. 1 is a diagram for describing an example of a usage mode of a wireless power transmitter according to a first embodiment;

FIG. 2 is a diagram for describing a wireless power transmission system according to the first embodiment;

FIG. 5 is a block diagram showing an example of a functional configuration of the wireless power transmitter;

FIG. 6 is a block diagram showing an example of a functional configuration of the measurement device;

FIG. 7 is a sequence chart showing an example of a processing procedure of the wireless power transmission system;

FIG. 8 is a diagram showing a case in which the measurement device is disposed farther away from the wireless power transmitter than the wireless communication device;

FIG. 9 is a diagram showing a case in which the measurement device is disposed away from a boundary between a detectable range and an undetectable range of the wireless power transmitter;

FIG. 10 is a diagram showing a case in which the measurement device is disposed within the detectable range of the wireless power transmitter;

DETAILED DESCRIPTION

Figure 3:
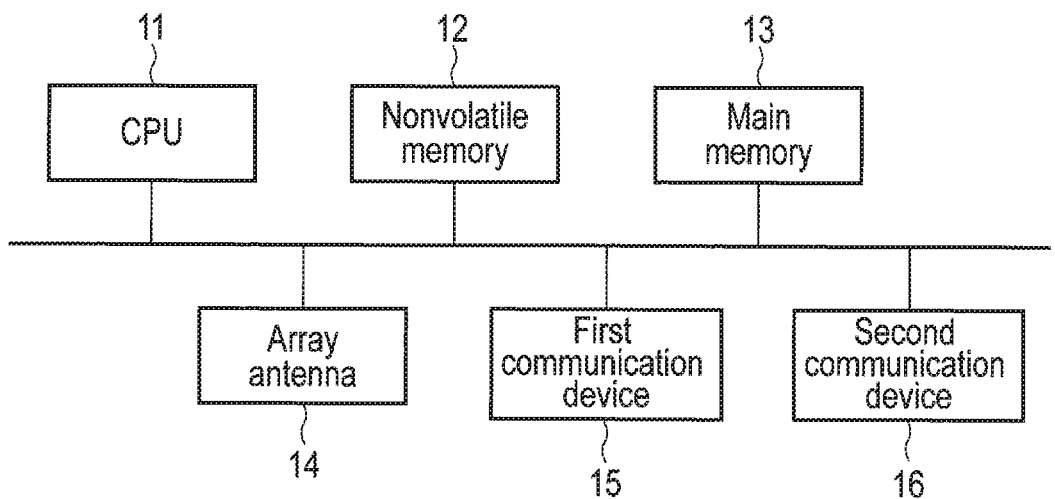
FIG. 3 is a diagram showing an example of a hardware configuration of a wireless power transmitter.

In general, according to one embodiment, an electronic apparatus communicable with a measurement apparatus includes a power supplier and control circuitry. The power supplier is configured to supply power by an electromagnetic wave. The control circuitry is configured to receive first information on a wireless signal measured by the measurement apparatus and control the electromagnetic wave for power supply based on both the first information and a position of the measurement apparatus.

Various embodiments will be described hereinafter with reference to the accompanying drawings.

First Embodiment

First, a first embodiment will be described. The electronic apparatus according to the first embodiment is a wireless power transmitter (WPT) which has a function of transmitting (supplying) power to a power receiver by an electromagnetic wave. According to such a wireless power transmitter, the power receiver can operate using the power transmitted by the electromagnetic wave from the wireless power transmitter (power transmitter).

Here, a usage mode of the wireless power transmitter according to the first embodiment will be described with reference to FIG. 1. As shown in FIG. 1, a wireless power transmitter 10 transmits (power supplying signal) to the power receiver for power supply disposed within a range (power transmission possible range) in which power can be transmitted from the wireless power transmitter 10, thereby transmitting power to the power receiver.

Although power receivers 20*a* and 20*b* are shown in the example shown in FIG. 1, the wireless power transmitter 10 transmits power to the power receiver 20*a* by transmitting the beam-like electromagnetic wave 10*a*, for example, in the direction of the power receiver 20*a*. Similarly, the wireless power transmitter 10 transmits power to the power receiver 20*b* by transmitting the beam-like electromagnetic wave 10*b*, for example, in the direction of the power receiver 20*b*.

Although the case in which power is transmitted to two power receivers 20*a* and 20*b* has been described herein, the number of power receivers to which power is transmitted by the wireless power transmitter 10 according to the first embodiment may be one or may be three or more.

However, there are cases in which other wireless communication systems such as a wireless LAN (WLAN) system are constructed (deployed) around the wireless power transmitter 10 and the power receivers 20*a* and 20*b*. According to such a wireless communication system, for example, wireless communication devices (mobile station (MS)) 40*a* to 40*c* existing in a service area of an access point (AP) 30 can perform wireless communication with a server device or the like which provides various services via the access point 30.

Here, in order to efficiently transmit power to the power receivers 20*a* and 20*b*, it is necessary for the wireless power transmitter 10 to transmit an electromagnetic wave having a power level, but in the case in which the electromagnetic wave having a high power level is transmitted, the electromagnetic wave is likely to interfere with other wireless communication systems which executes wireless communication using frequencies (channels) which are the same as or close to the electromagnetic wave.

Specifically, as shown in FIG. 1, when other wireless communication systems exist in the direction from the wireless power transmitter 10 to the power receiver 20*a*, the beam-like electromagnetic wave 10*a* transmitted from the wireless power transmitter 10 to the power receiver 20*a* is likely to interfere with a wireless signal (electromagnetic wave) transmitted and received by the wireless communication device 40*a*, for example. Although not shown in FIG. 1, when other wireless communication systems exist in the direction from the wireless power transmitter 10 to the power receiver 20*b*, even when the beam-like electromagnetic wave 10*b* is transmitted from the wireless power transmitter 10 to the power receiver 20*b*, the beam-like electromagnetic wave 10*b* is likely to interfere with the wireless signals in the other wireless communication systems.

Therefore, for example, in the case in which the existence of the wireless communication system is detected by monitoring the wireless signals transmitted and received by the wireless communication devices in other wireless communication systems, it is considered to control the electromagnetic wave for power supply (power level and the like of the electromagnetic wave) transmitted from the wireless power transmitter 10 so as not to interfere with the wireless communication system.

However, as shown in FIG. 1, in the case in which the wireless communication system is constructed (the access point 30 and the wireless communication devices 40*a* to 40*c* exist) within the range in which the wireless power transmitter 10 cannot detect, it is difficult to control the electromagnetic wave so as not to interfere with the wireless communication system. For this reason, there is a possibility that the interference with other wireless communication systems is likely to occur due to the electromagnetic wave for power supply transmitted from the wireless power transmitter 10, thus deteriorating the communication situations in the wireless communication system.

Therefore, in the first embodiment, as shown in FIG. 2, a measurement device (apparatus) 50 which is communicably connected to the wireless power transmitter 10 is disposed (located) in the range in which for example, the wireless power transmitter 10 cannot detect the existence of the wireless communication system. In addition, in the first embodiment, the wireless power transmitter 10 and the measurement device 50 constitute a wireless power transmission system for transmitting power to the power receivers 20*a* and 20*b* as described above.

In the following description, for the sake of convenience, the range in which the wireless power transmitter 10 can detect other wireless communication systems is referred to as a detectable range of the wireless power transmitter 10, and the range in which the wireless power transmitter 10 cannot detect other wireless communication systems is referred to as an undetectable range of the wireless power transmitter 10.

Hereinafter, the wireless power transmission system (the wireless power transmitter 10 and the measurement device 50) according to the first embodiment will be described.

FIG. 3 shows an example of a hardware configuration of the wireless power transmitter 10. As shown in FIG. 3, the wireless power transmitter 10 includes a CPU 11, a nonvolatile memory 12, a main memory 13, an array antenna 14, a first communication device 15, a second communication device 16, and the like.

The CPU 11 is a hardware processor (or control circuitry) which controls operations of each component in the wireless power transmitter 10. The CPU 11 executes a program loaded from the nonvolatile memory 12, which is a storage device, onto the main memory 13.

The array antenna 14 is constituted by a plurality of element antennas. In the array antenna 14, the electromagnetic wave for power supply (for example, microwave) is generated by using the plurality of element antennas. The electromagnetic wave for power supply generated in this manner is formed into the beam shape by, for example, a beam forming technique, and is transmitted from the array antenna 14 to the above-described power receivers 20*a* and 20*b*. A direction in which the electromagnetic wave for power supply is transmitted can be determined by independently controlling amplitude and a phase of excitation of each element antenna constituting the array antenna 14.

The first communication device 15 is a device configured to be able to monitor, for example, the wireless LAN communication so as to receive the wireless signal that may get interfered due to the electromagnetic wave transmitted from the wireless power transmitter 10.

The second communication device 16 is a device configured to execute communication with the above-described measurement device 50. In the first embodiment, it is assumed that the second communication device 16 executes communication according to a predetermined communication scheme which does not cause the interference with the above-described other wireless communication systems. Specifically, the second communication device 16 may execute the wireless communication according to a standard such as Bluetooth (registered trademark) or Zigbee (registered trademark), or may perform communication in a wired manner.

Figure 4:
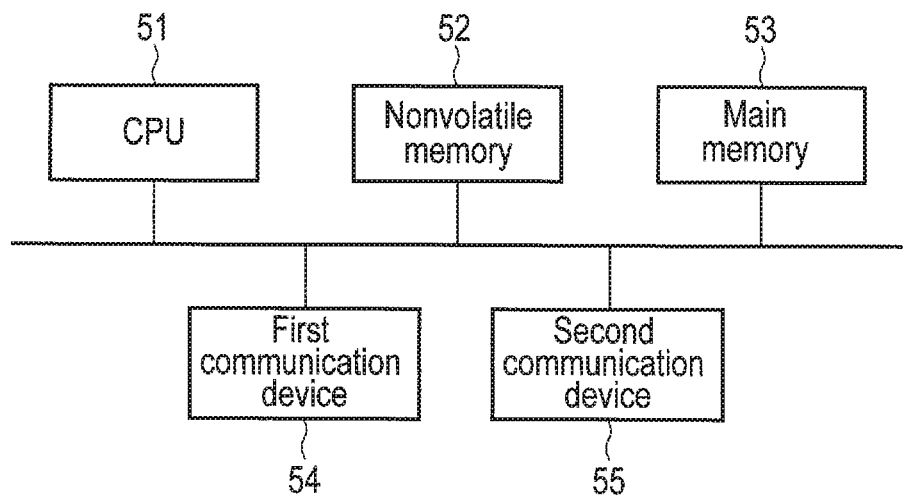
FIG. 4 is a diagram showing an example of a hardware configuration of a measurement device.

FIG. 4 shows an example of a hardware configuration of the measurement device 50. As shown in FIG. 4, the measurement device 50 includes a CPU 51, a nonvolatile memory 52, a main memory 53, a first communication device 54, a second communication device 55, and the like.

The CPU 51 is a hardware processor (or control circuitry) which controls operations of each component in the measurement device 50. The CPU 51 executes a program loaded from the nonvolatile memory 52, which is a storage device, onto the main memory 53.

Similar to the first communication device 15 included in the above-described wireless power transmitter 10, the first communication device 54 is a device configured to be able to monitor, for example, the wireless LAN communication so as to receive the wireless signal which may get interfered due to the electromagnetic wave transmitted from the wireless power transmitter 10.

The second communication device 55 is a device corresponding to the second communication device 16 included in the wireless power transmitter 10 described above. That is, the second communication device 55 is configured to execute communication with the wireless power transmitter 10, and executes communication according to a predetermined communication scheme which does not cause the interference with other wireless communication systems.

FIG. 5 is a block diagram showing an example of a functional configuration of the wireless power transmitter 10. As shown in FIG. 5, the wireless power transmitter 10 includes a detection module 101, a database 102, a power transmitting module 103, a receiving module 104, and a control module 105.

In the first embodiment, a part or the entirety of the detection module 101, the power transmitting module 103, the receiving module 104, and the control module 105 are realized by causing the above-described CPU 11 to execute a program, that is, software. It is to be noted that a part or the entirety of each of the modules 101 and 103 to 105 may be realized by an integrated circuit (IC), dedicated hardware, or the like or may be realized by a combined configuration of software and hardware. In addition, the database 102 is realized by a storage device such as the nonvolatile memory 12 described above.

The detection module 101 detects (receives) the wireless signals via the first communication device 15 of the above-described wireless power transmitter 10 within a detectable range (that is, within a distance within which the wireless power transmitter 10 can detect other wireless communication systems), thereby detecting whether there are other wireless communication systems. The detectable range of the wireless power transmitter 10 depends on the performance or the like of the first communication device 15.

The database 102 stores information on power transmission by the wireless power transmitter 10. Specifically, the database 102 previously stores position information indicating a position of the power receivers 20a and 20b to which the wireless power transmitter 10 transmits power and position information (second information) indicating a position of the measurement device 50. Alternatively, the wireless power transmitter 10 may receive the wireless signals transmitted from the power receivers 20a and 20b, and estimate the second information using the received result every time. In the following description, for the sake of convenience, the position information indicating the positions of the power receivers 20a and 20b is referred to as the position information of the power receivers 20a and 20b, and the position information indicating the position of the measurement device 50 is referred to as the position information of the measurement device 50. Herein, the position information here may be absolute coordinates or relative coordinates. Alternatively, the position information may be information related to positions such as azimuth information and distance information.

The power transmitting module 103 transmits the power supplying beam-like electromagnetic wave via the array antenna 14, thereby transmitting power to the power receivers 20a and 20b by the electromagnetic wave. The direction (that is, the direction of the power receivers 20a and 20b) in which the electromagnetic wave for power supply is transmitted is determined based on the position information of the power receivers 20a and 20b stored in the above-described database 102.

The receiving module 104 receives the feedback information (first information) transmitted from the measurement device 50 via the second communication device 16. The feedback information will be described later.

The control module 105 controls the array antenna 14 to control the electromagnetic wave for power supply (electromagnetic wave for transmitting power) for transmitting power to the power receivers 20a and 20b. It is to be noted that the control module 105 controls the electromagnetic wave for power supply according to whether the existence of other wireless communication systems is detected by the detection module 101. In addition, the control module 105 controls the electromagnetic wave for power supply based on the position information of the power receivers 20a and 20b stored in the database 102, the position information of the measurement device 50, and the feedback information received by the receiving module 104.

FIG. 6 is a block diagram showing an example of a functional configuration of the measurement device 50. As described above, the measurement device 50 is, for example, disposed outside the detectable range of the wireless power transmitter 10 (the wireless power transmitter 10 is disposed at a position farther away from the wireless power transmitter 10 than the distance at which the wireless power transmitter 10 can detect other wireless communication systems).

As shown in FIG. 6, the measurement device 50 includes a detection module 501, an analysis module 502, and a transmitting module 503.

In the first embodiment, a part or the entirety of the detection module 501, the analysis module 502, and the transmitting module 503 are realized by causing the above-described CPU 51 to execute a program, that is, software. It is to be noted that a part or the entirety of each of the modules 501 to 503 may be realized by an integrated circuit (IC), dedicated hardware, or the like or may be realized by a combined configuration of software and hardware.

The detection module 501 detects (receives) a wireless signal via the first communication device 54 within the range (hereinafter, referred to as a detectable range of the measurement device 50) in which the above-described other wireless communication systems can be detected, thereby detecting the existence of the corresponding wireless communication system. The detectable range of the measurement device 50 depends on the performance or the like of the first communication device 54.

When the existence of other wireless communication systems is detected by the detection module 501, the analysis module 502 analyzes (measures) the wireless signal received via the first communication device 54, thereby acquiring information on the wireless signal (feedback information). It is to be noted that the feedback information acquired by the analysis module 502 includes a frequency channel (frequency band) in which the wireless signals in other wireless communication systems are transmitted, a signal strength (RSSI: received signal strength indicator) of the wireless signal, and the like. In addition, the feedback information may include a usage rate (usage frequency) of each frequency channel in other wireless communication systems.

The transmitting module 503 transmits (feedbacks) feedback information to the wireless power transmitter 10 via the second communication device 55.

Next, an example of a processing procedure of the wireless power transmitter 10 and the measurement device 50 (wireless power transmission system) according to the first embodiment will be described with reference to a sequence chart of FIG. 7.

It should be noted that the processing shown in FIG. 7 may be executed when the wireless power transmitter 10 starts the transmission of power, but it may be executed at predetermined intervals, for example.

First, the measurement device 50 monitors the wireless signal within the detectable range of the measurement device 50. As a result, when the wireless signal is received (detected) by the measurement device 50, the detection module 501 included in the measurement device 50 detects the existence of other wireless communication systems (step S1).

When the existence of other wireless communication systems is detected in step S1, the analysis module 502 collects the wireless signals (wireless signals within the detectable range of the measurement device 50) in the wireless communication system and analyzes the collected wireless signals. The analysis module 502 acquires the information on the analyzed wireless signals as the feedback information (step S2). The wireless signal to be analyzed by the analysis module 502 may be the wireless signal detected in step S1, may be the wireless signal additionally detected after the step S1, or may be both thereof.

The feedback information acquired in step S2 is transmitted to the wireless power transmitter 10 by the transmitting module 503 included in the measurement device 50 (step S3). It should be noted that the feedback information is transmitted according to the predetermined communication scheme (for example, Bluetooth, Zigbee, a wire, or the like) which prevents the feedback information from interfering with the wireless signals in other wireless communication systems detected in step S1 as described above).

The feedback information transmitted in step S3 is received by the receiving module 104 included in the wireless power transmitter 10.

Next, the control module 105 controls the electromagnetic wave for power supply (electromagnetic wave for transmitting power) transmitted from the wireless power transmitter 10 based on the feedback information received by the receiving module 104 and the position information of the measurement device 50 stored in the database 102.

In this case, the control module 105 calculates parameters related to the power transmission (that is, electromagnetic wave for power supply) (step S4). The parameters calculated in step S4 include, for example, the frequency channel (frequency band) at which the electromagnetic wave is transmitted, the power level when the electromagnetic wave is transmitted, and the like. The parameters may also include, for example, the period during which the electromagnetic wave is transmitted, and the like.

The control module 105 generates the electromagnetic wave for power supply to transmit power to the power receiver 20*a* and 20*b* based on the power level included in the parameters calculated in step S4 and transmits power to the power receivers 20*a* and 20*b* (step S5).

When power is transmitted in step S5, the electromagnetic wave for power supply is transmitted from the array antenna 14, but the electromagnetic wave is transmitted on the frequency channel included in the parameters calculated in step S4. In addition, the direction, (that is, the direction of the power receivers 20*a* and 20*b*) in which the electromagnetic wave for power supply is transmitted is specified based on the position information of the power receivers 20*a* and 20*b* stored in the database 102.

Hereinafter, the processing for controlling the above-described electromagnetic wave for power supply will be described in detail. Here, as shown in FIG. 2, it is assumed that the access point 30 and the wireless communication devices 40*a* to 40*c* in other wireless communication systems are disposed at a position farther away from the wireless power transmitter 10 than the measurement device 50. In this case, the wireless power transmitter 10 (detection module 101) does not detect other wireless communication systems.

In the first embodiment, the wireless power transmitter 10 and the measurement device 50 do not grasp the positions of the access point 30 and the wireless communication devices 40*a* to 40*c* which execute wireless communication in the wireless communication system.

Here, if the wireless power transmitter 10 receives the feedback information (that is, the existence of the wireless communication system is detected by the measurement device 50), the electromagnetic waves and the wireless signals in the wireless communication system are likely to interfere with each other at least at the position of the measurement device 50.

For this reason, for example, when the measurement device 50 is disposed in the direction of the power receiver 20*a* as shown in FIG. 2, the control module 105 calculates the power level (parameters) which prevents the electromagnetic wave from interfering at the position (that is, position shown by the position information of the measurement device 50 stored in the database 102) of the measurement device 50, thereby controlling the electromagnetic wave for power supply.

Specifically, the control module 105 controls the electromagnetic wave so that the distance from the wireless power transmitter 10 capable of causing the interference with the electromagnetic wave when power is transmitted by the electromagnetic wave is shorter than the distance from the wireless power transmitter 10 to the measurement device 50.

In other words, (power level of) the electromagnetic wave is controlled so that intensity (magnitude) of the electromagnetic wave at the position of the measurement device 50 when power is transmitted by the electromagnetic wave is less than an intensity (threshold value) strong enough to cause the interference. The intensity of the electromagnetic wave strong enough to cause the interference is referred to as the intensity of the electromagnetic wave that deteriorates the communication situations in the wireless communication system.

The intensity of the electromagnetic wave at the position of the measurement device 50 can be calculated based on a relative position (the distance from the wireless power transmitter 10 to the measurement device 50) of the measurement device 50 with respect to the position of the wireless power transmitter 10 and an attenuation model of the electromagnetic wave. In addition, the intensity (that is, the measurement result) of the electromagnetic wave from the wireless power transmitter 10 measured (analyzed) by the measurement device 50 may be fed back to the wireless power transmitter 10, as the intensity of the electromagnetic wave at the position of the measurement device 50.

Here, as described above, the feedback information transmitted by the measurement device 50 (transmitting module 503) includes the frequency channel in which the wireless signals in other wireless communication systems are transmitted, the signal strength of the wireless signal, the usage rate of each frequency channel, and the like.

Therefore, the control of the electromagnetic wave based on the position of the measurement device 50 described above is executed, for example, when the electromagnetic wave for power supply is transmitted on the frequency channel in which the interference with the frequency channel included in the feedback information is likely to occur.

The control module 105 may control the electromagnetic wave so as to transmit the electromagnetic wave for power supply in different frequency channels so as not to cause interference with the frequency channel included in the feedback information, for example. In addition, the control module 105 may transmit the electromagnetic wave on a frequency channel having a low usage rate based on the usage rate of each frequency channel included in the feedback information.

Furthermore, the control module 105 may estimate the position of the wireless communication device (the distance from the measurement device 50) based on the signal strength included in the feedback information, for example, and correct (compensate) the distance (hereinafter, referred to as the interference distance) from the wireless power transmitter 10 at which the above-described electromagnetic wave for power supply can cause interference. Specifically, when the signal strength included in the feedback information is greater than the threshold value, since it can be estimated that the wireless communication device exists in the vicinity of the measurement device 50, for example, the electromagnetic wave for power supply is controlled so that for example, the interference distance is shorter than a distance obtained by subtracting the predetermined distance from the distance from the wireless power transmitter 10 to the measurement device 50. On the other hand, when the signal strength included in the feedback information is smaller than the threshold value, since it can be estimated that the wireless communication device exists at a position relatively far from the measurement device 50, the electromagnetic wave for power supply may be controlled so that the interference distance is longer than the case in which the signal strength included in the feedback information is greater than the threshold value.

The first embodiment describes that the above-described control is executed based on the frequency channel, the signal strength, and the usage rate of each frequency channel included in the feedback information as described above, but the feedback information may also be the information indicating only that the existence of the wireless communication system is detected. Even in this case, the control module 105 can control the electromagnetic wave so that the interference distance is shorter than the distance from the wireless power transmitter 10 to the measurement device 50.

In addition, the beam-like electromagnetic waves 10a and 10b are transmitted to each of the power receivers 20a and 20b in the example shown in FIG. 2, but the above-described control of the electromagnetic wave may be executed only on the electromagnetic wave 10a transmitted to the power receiver 20a positioned in the same direction as the measurement device 50.

In addition, as described above, when the power receiver 20a exists in the same direction as the measurement device 50, the control module 105 may be configured to transmit the electromagnetic wave for power supply in a direction different from the direction (azimuth) of the measurement device 50 based on the position information of the measurement device 50 stored in the database 102.

Furthermore, in the first embodiment, for example, one beam-like electromagnetic wave capable of transmitting power to both of the power receivers 20a and 20b may also be transmitted, and the electromagnetic wave may be controlled as described above.

As described above, in the first embodiment, the feedback information (first information) on the wireless signal measured (analyzed) by the measurement device 50 is received, and the electromagnetic wave for power supply is controlled based on the received feedback information and the position information (second information) indicating the position of the measurement device 50. According to this configuration, it is possible to avoid interference with other wireless communication systems different from the wireless power transmission system due to the electromagnetic wave for power supply.

In the first embodiment, the feedback information is transmitted from the measurement device 50 to the wireless power transmitter 10 according to the communication scheme which prevents the feedback information from interfering with the wireless signals in other wireless communication systems (in which the influence of interference on the wireless signals is reduced). With such a configuration, it is possible to avoid deteriorating the communication situations in other wireless communication systems by using the feedback information transmitted from the measurement device 50 to the wireless power transmitter 10.

In addition, in the first embodiment, the wireless power transmitter 10 can detect the wireless signal within the detectable range, but the measurement device 50 is disposed at a position (that is, outside the detectable range of the wireless power transmitter 10) farther away from the wireless power transmitter 10 than the distance. In the first embodiment, with such a configuration, even in the case in which other wireless communication systems exist in the undetectable range (the distance at which the wireless power transmitter 10 cannot be detected) of the wireless power transmitter 10, the existence of the wireless communication system can be detected by the measurement device 50 and the electromagnetic wave for power supply can be controlled so as to avoid the interference with the wireless communication system.

Here, in the first embodiment, the wireless power transmitter 10 and the measurement device 50 do not grasp the positions of the access point 30 and the wireless communication devices 40a to 40c and the like as described above. However, when the existence of other wireless communication systems is detected by the measurement device 50, it can be grasped that the electromagnetic wave for power supply is likely to interfere with the wireless signals in the wireless communication systems at the position of the measurement device 50.

Therefore, when the existence of other wireless communication systems is detected by the measurement device 50 and the feedback information transmitted from the measurement device 50 is received by the wireless power transmitter 10, the electromagnetic wave for power supply transmitted from the wireless power transmitter 10 is controlled so that the interference distance is shorter than the distance from the wireless power transmitter 10 to the measurement device 50 (that is, lower the power level of the electromagnetic wave). With such a configuration, it is possible to avoid the interference of the electromagnetic wave for power supply with the wireless signal at least at the position of the measurement device 50.

In the first embodiment, as shown in FIG. 2, for example, it is assumed that the wireless communication devices 40a to 40c in other wireless communication systems exist at a position farther away from the wireless power transmitter 10 than the measurement device 50 (that is, the measurement device 50 is disposed at a position closer to the wireless power transmitter 10 than the wireless communication devices 40a to 40c). The positional relationship between the wireless power transmitter 10, the wireless communication devices 40a to 40c, and the measurement device 50 can be estimated by allowing the wireless power transmitter 10 not to detect the existence of other wireless communication systems and allowing the measurement device 50 to detect the existence of other wireless communication systems, for example, in the state in which the measurement device 50 is disposed in the vicinity of the boundary between the detectable range and the undetectable range of the wireless power transmitter 10. It is assumed that the detectable range of the wireless power transmitter 10 is managed (grasped) in the wireless power transmitter 10, and the position at which the measurement device 50 is disposed can be specified by the position information of the measurement device 50 stored in the database 102. According to the detectable range of the wireless power transmitter 10 and the position at which the measurement device 50 is disposed, it is possible to discriminate the state in which the above-described measurement device 50 is disposed in the vicinity of the boundary between the detectable range and the undetectable range of the wireless power transmitter 10.

In addition, in the first embodiment, when the measurement device 50 does not detect the existence of other wireless communication systems (that is, the feedback information is not transmitted from the measurement device 50 to the wireless power transmitter 10), the electromagnetic wave for power supply to be transmitted from the wireless power transmitter 10 may be controlled to the extent that the interference distance does not exceed the detectable range of the measurement device 50.

In addition, the first embodiment describes that the wireless power transmitter 10, the wireless communication devices 40*a* to 40*c*, and the measurement device 50 are described as having the positional relationship shown in FIG. 2 as described above, but for example, as shown in FIG. 8, the measurement device 50 may exist farther away from (at a position farther away from) the wireless power transmitter 10 than at least one (here, the wireless communication device 40*a*) of the wireless communication devices 40*a* to 40*c* (that is, the wireless communication device exists on the side of the wireless power transmitter 10 rather than the measurement device 50).

It is assumed that the service area of the access point 30 and the detectable range of the wireless power transmitter 10 do not overlap with each other in the positional relationship shown in FIG. 2 as described above, but in the positional relationship shown in FIG. 8, it is assumed that a part of the service area of the point 30 overlaps with a part of the detectable range of the wireless power transmitter 10.

Here, in the case of the positional relationship shown in FIG. 8 described above, for example, the wireless signal transmitted from the wireless communication device 40*a* is received by both the wireless power transmitter 10 and the measurement device 50 (the wireless power transmitter 10 and the measurement device 50 both detect the existence of the wireless communication system). That is, the positional relationship shown in FIG. 8 can be estimated by allowing the wireless power transmitter 10 and the measurement device 50 to detect the existence of other wireless communication systems in the state in which the measurement device 50 is disposed in the vicinity of the boundary between the detectable range and the undetectable range of the wireless power transmitter 10, for example.

When the feedback information transmitted from the measurement device 50 in the positional relationship shown in FIG. 8 as described above is received by the wireless power transmitter 10, the electromagnetic wave for power supply is controlled so that the interference distance is shorter than the distance obtained by subtracting the distance at which other wireless communication systems can be detected (the wireless signal can be measured) by the measurement device 50 from the distance from the wireless power transmitter 10 to the measurement device 50. According to such a configuration, it is possible to avoid the interference of the electromagnetic wave for power supply with the wireless signal at the position of the wireless communication device 40*a* positioned closer to the wireless power transmitter 10 than at least the measurement device 50.

For convenience, FIG. 8 shows only the detectable range in the direction from the measurement device 50 to the wireless power transmitter 10 in order to indicate the distance at which the above-described measurement device 50 can detect other wireless communication systems, but the measurement device 50 can similarly detect the existence of the wireless communication system even in the direction far away from the wireless power transmitter 10.

Here, in the case of the positional relationship shown in FIG. 8, since the existence of other wireless communication systems can also be detected in the wireless power transmitter 10, for example, even in the case in which the measurement device 50 is not disposed, it is possible to avoid the interference with the wireless communication system by stopping transmitting the electromagnetic wave for power supply. However, in the first embodiment, the electromagnetic wave for power supply can be transmitted at the power level at which the interference distance is shorter than the distance obtained by subtracting the distance at which other wireless communication systems can be detected by the measurement device 50 from the distance from the wireless power transmitter 10 to the measurement device 50 as described above, by disposing the measurement device 50. Therefore, it is possible to increase the efficiency of the power transmission.

In addition, as shown in FIG. 9, the measurement device 50 may be disposed far away from the boundary between the detectable range and the undetectable range of the wireless power transmitter 10. In the case of the positional relationship shown in FIG. 9, the electromagnetic wave may be controlled similarly to the case of the positional relationship shown in FIG. 8 as described above. In the case of the positional relationship shown in FIG. 9, the wireless power transmitter 10 does not detect other wireless communication systems, and the measurement device 50 detects other wireless communication systems. For this reason, the electromagnetic wave for power supply transmitted from the wireless power transmitter 10 may be controlled to the extent that the interference distance does not exceed the detectable range of the wireless power transmitter 10.

Furthermore, the first embodiment describes that the measurement device 50 is disposed outside the detectable range of the wireless power transmitter 10, but the measurement device 50 may be disposed within the detectable range of the wireless power transmitter 10 as shown in FIG. 10. FIG. 10 shows only the detectable range of the measurement device 50 in the direction away from the wireless power transmitter 10, but the measurement device 50 can be similarly detect the wireless communication system even in the direction toward the wireless power transmitter 10.

Hereinafter, when the measurement device 50 is disposed within the detectable range of the wireless power transmitter 10 as described above, an example of controlling the electromagnetic wave for power supply depending on the position of the wireless communication device will be briefly described.

First, for example, when the wireless communication devices 40*a* to 40*c* exist at the position shown in FIG. 10, the wireless power transmitter 10 does not detect other wireless communication systems, but the measurement device 50 can detect other wireless communication systems. According to this, the wireless power transmitter 10 can grasp that at least the wireless communication system (the wireless communication devices 40a to 40c) do not exist within the detectable range of the wireless power transmitter 10. Therefore, in this case, the electromagnetic wave for power supply is controlled so as to make the interference distance shorter than the detectable range of the wireless power transmitter 10 (the distance from the wireless power transmitter 10 that can detect other wireless communication systems). In this case, for example, a control may be executed so that the electromagnetic wave for power supply is transmitted in the direction other than the direction of the measurement device 50.

Next, for example, when the wireless communication device exists within the detectable range of the wireless power transmitter 10 and the measurement device 50, both the wireless power transmitter 10 and the measurement device 50 detect other wireless communication systems. In this case, similar to the case of the positional relationship shown in FIG. 8 as described above, the electromagnetic wave for power supply is controlled.

Furthermore, for example, when the wireless communication device does not exist within the detectable range of the wireless power transmitter 10 and the measurement device 50, both the wireless power transmitter 10 and the measurement device 50 cannot detect other wireless communication systems. In this case, it is assumed that the electromagnetic wave for power supply is controlled to the extent that the interference distance does not exceed the detectable range of the wireless power transmitter 10 or the measurement device 50.

In addition, for example, when the wireless communication device exists within the detectable range of the wireless power transmitter 10 but the wireless communication device does not exist within the detectable range of the measurement device 50, the wireless power transmitter 10 detects other wireless communication systems but the measurement device 50 cannot detect other wireless communication systems. In this case, for example, a control may be executed so that the electromagnetic wave for power supply is transmitted only in the direction of the measurement device 50.

Here, in the first embodiment, when the electromagnetic wave for power supply is mainly controlled depending on whether the wireless communication system is detected by the wireless power transmitter 10 and the measurement device 50, but when the wireless power transmitter 10 and the measurement device 50 include an antenna having directivity, it is possible to estimate the position of the wireless communication device (other wireless communication systems) based on the signal strength or the like included in the feedback information. In the case of controlling the electromagnetic wave for power supply in consideration of the estimated position of the wireless communication device, since it is possible to transmit the electromagnetic wave for power supply having a high power level within the range in which the interference can be avoided, more efficient power transmission can be realized.

In the first embodiment, the position information indicating the position of the measurement device 50 is used at the time of controlling the electromagnetic wave for power supply, but the position of the measurement device 50 may be moved (changed). When the position of the measurement device 50 is moved, the position information (third information) indicating the position of the measurement device 50 after the movement is stored in the database 102 of the wireless power transmitter 10 (that is, the position information of the measurement device 50 is updated). According to this, the wireless power transmitter 10 can control the electromagnetic wave for power supply based on the position information indicating the position of the measurement device 50 after the movement.

The position information indicating the position of the measurement device 50 after the movement may be transmitted from the external devices such as the measurement device 50 to the wireless power transmitter 10, or may be directly input (designated) to the wireless power transmitter 10 by a manager or the like. That is, the wireless power transmitter 10 may be provided with an interface for updating the position after the movement of the measurement device 50.

It should be noted that the "distance" described in the first embodiment may be a concept including, for example, a predetermined difference as a margin.

Second Embodiment

Next, a second embodiment will be described. In the second embodiment, parts similar to drawings used in the description of the above-described first embodiment are denoted by the same reference numerals. In addition, in the following description, parts different from the above-described first embodiment will be mainly described.

First, a wireless power transmission system according to a second embodiment will be described with reference to FIG. 11. Similar to the above-described first embodiment, a wireless power transmitter 10 according to the second embodiment transmits power supplying beam-like electromagnetic waves 10a and 10b to power receivers 20a and 20b disposed within a range (power transmission possible range) in which power can be transmitted from the wireless power transmitter 10 to transmit power to the power receivers 20a and 20b.

The second embodiment is different from the above-described first embodiment in that a plurality of measurement devices 50a and 50b are disposed.

For example, the measurement device 50a is communicably connected to the wireless power transmitter 10, and can detect the existence of other wireless communication systems by monitoring a wireless signal within a detectable range (monitoring area) 60a of the measurement device 50a. It should be noted that the communication between the wireless power transmitter 10 and the measurement device 50a is executed according to the communication scheme (for example, Bluetooth, Zigbee, a wire, or the like) which does not cause the interference with other wireless communication systems.

On the other hand, the measurement device 50b can detect the existence of other wireless communication systems by monitoring the wireless signal within a detectable range (monitoring area) 60b of the measurement device 50b. It is assumed that the measurement device 50b is communicably connected to the measurement device 50a, but is not communicably connected to the wireless power transmitter 10. Similar to the communication between the wireless power transmitter 10 and the measurement device 50a, it is assumed that the communication between the measurement devices 50a and 50b is executed according to the communication scheme which does not cause the interference with other wireless communication systems.

The hardware configuration and the functional configuration of the wireless power transmitter 10 according to the second embodiment are the same as those of the above-described first embodiment, and therefore a detailed description thereof will be omitted. In the second embodiment, the position information (hereinafter, referred to as the position information of the measurement device 50*a* and the position information of the measurement device 50*b*) indicating the positions of each of the measurement devices 50*a* and 50*b* are stored in the database 102 included in the wireless power transmitter 10.

In addition, the hardware configuration and the functional configuration of the measurement devices 50*a* and 50*b* according to the second embodiment are the same as the measurement device 50 of the above-described first embodiment, and therefore a detailed description thereof will be omitted.

The second embodiment describes that the measurement devices 50*a* and 50*b* are disposed, but the number of measurement devices disposed in the second embodiment may be three or more.

Next, an example of a processing procedure of the wireless power transmitter 10 and the measurement devices 50*a* and 50*b* (wireless power transmission system) according to the second embodiment will be described with reference to a sequence chart of FIG. 12.

Figure 12:
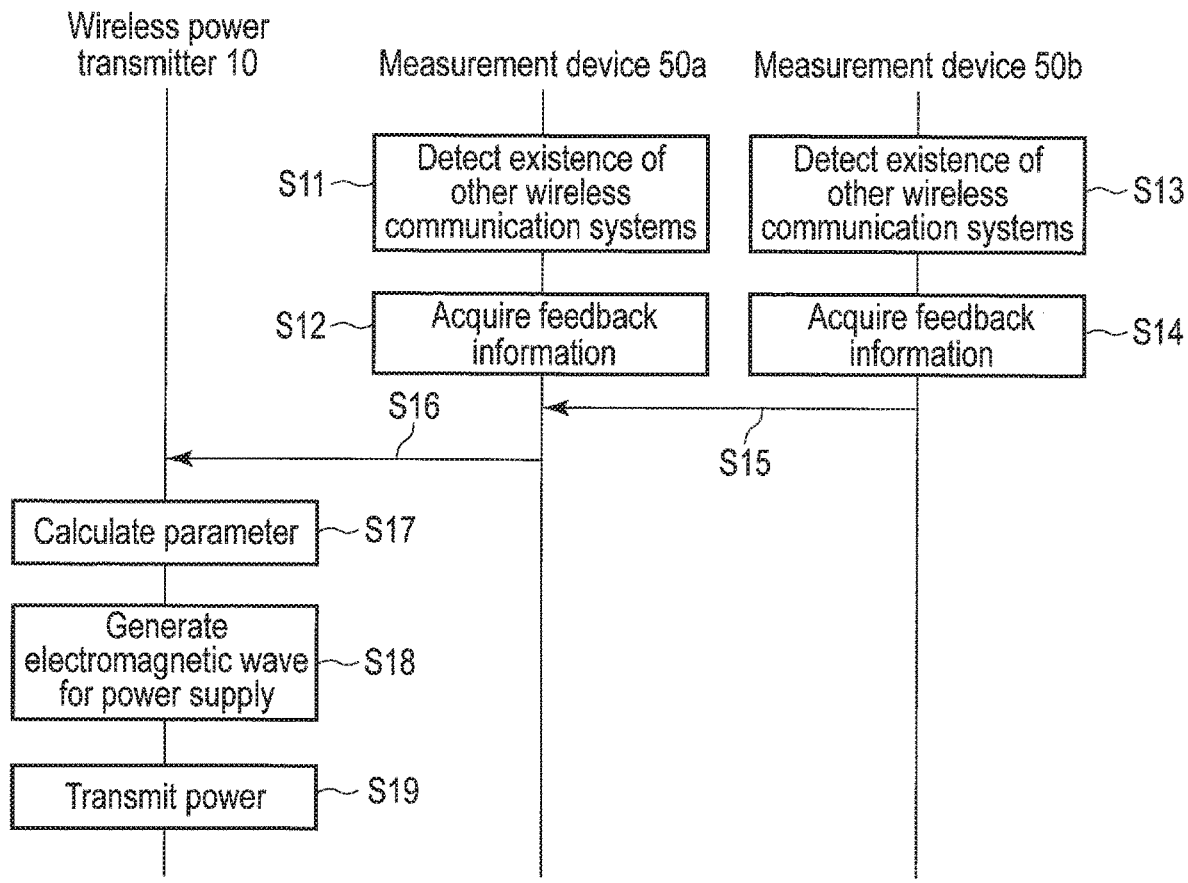
FIG. 12 is a sequence chart showing an example of a processing procedure of the wireless power transmission system.

It should be noted that the processing shown in FIG. 12 may be executed when the wireless power transmitter 10 starts the transmission of power, but it may be executed at predetermined intervals, for example.

First, the measurement device 50*a* monitors a wireless signal within a detectable range (a range in which the measurement device 50*a* can detect other wireless communication systems) 60*a* of the measurement device 50*a*. As a result, when the wireless signal is received (detected) by the measurement device 50*a*, a detection module 501 included in the measurement device 50*a* detects the existence of other wireless communication systems (step S11).

When the existence of other wireless communication systems is detected in step S11, an analysis module 502 included in the measurement device 50*a* collects the wireless signals (wireless signals within the detectable range 60*a* of the measurement device 50*a*) in the wireless communication system and analyzes the collected wireless signals. The analysis module 502 included in the measurement device 50*a* acquires the information on the analyzed wireless signals as the feedback information (step S12).

On the other hand, the measurement device 50*b* monitors wireless signal within the detectable range (a range in which the measurement device 50*b* can detect other wireless communication systems) 60*b* of the measurement device 50*b*. As a result, when the wireless signal is received (detected) by the measurement device 50*b*, the detection module 501 included in the measurement device 50*b* detects the existence of other wireless communication systems (step S13).

When the existence of other wireless communication systems is detected in step S13, the analysis module 502 included in the measurement device 50*b* collects the wireless signals (wireless signals within the detectable range 60*b* of the measurement device 50*b*) in the wireless communication system and analyzes the collected wireless signals. The analysis module 502 included in the measurement device 50*b* acquires the information on the analyzed wireless signals as the feedback information (step S14).

The feedback information acquired in steps S12 and S14 is similar to the feedback information described in the above-described first embodiment, and therefore a detailed description thereof will be omitted herein.

Here, in the second embodiment, the measurement device 50*a* is communicably connected to the wireless power transmitter 10, but the measurement device 50*b* is not communicably connected to the wireless power transmitter 10.

Therefore, a transmitting module 503 included in the measurement device 50*b* transmits the feedback information acquired in step S14 to the measurement device 50*a* (step S15). The feedback information is transmitted according to a communication scheme that does not cause the interference with other wireless communication systems detected in step S11 and other wireless communication systems detected in step S13.

When the processing in step S15 is executed, the transmitting module 503 included in the measurement device 50*a* transmits the feedback information (hereinafter, referred to as the feedback information of the measurement device 50*a*) acquired in step S12 and the feedback information (hereinafter, referred to as the feedback information of the measurement device 50*b*) transmitted in step S15 to the wireless power transmitter 10 (step S16). Alternatively, the feedback information of the measurement device 50*a* and the feedback information of the measurement device 50*b* may be separately transmitted. The feedback information of the measurement device 50*a* and the feedback information of the measurement device 50*b* are transmitted according to a communication scheme that does not cause the interference with other wireless communication systems detected in step S11 and other wireless communication systems detected in step S13.

The feedback information of the measurement device 50*a* and the feedback information of the measurement device 50*b* transmitted in step S16 are received by the receiving module 104 included in the wireless power transmitter 10.

In this case, the control module 105 included in the wireless power transmitter 10 controls the electromagnetic wave for power supply (electromagnetic wave for transmitting power) transmitted from the wireless power transmitter 10 based on the feedback information (the feedback information of the measurement device 50*a* and the feedback information of the measurement device 50*b*) received by the receiving module 104 and the position information (the position information of the measurement device 50*a* and the position information of the measurement device 50*b*) stored in the database 102.

In this case, the processing in steps S17 to S19 corresponding to the processing in steps S4 to S6 shown in FIG. 7 as described above are executed. That is, the processing related to the control of the electromagnetic wave for power supply in the second embodiment is the same as that in the above-described first embodiment, and therefore a detailed description thereof will be omitted herein.

Figure 11:
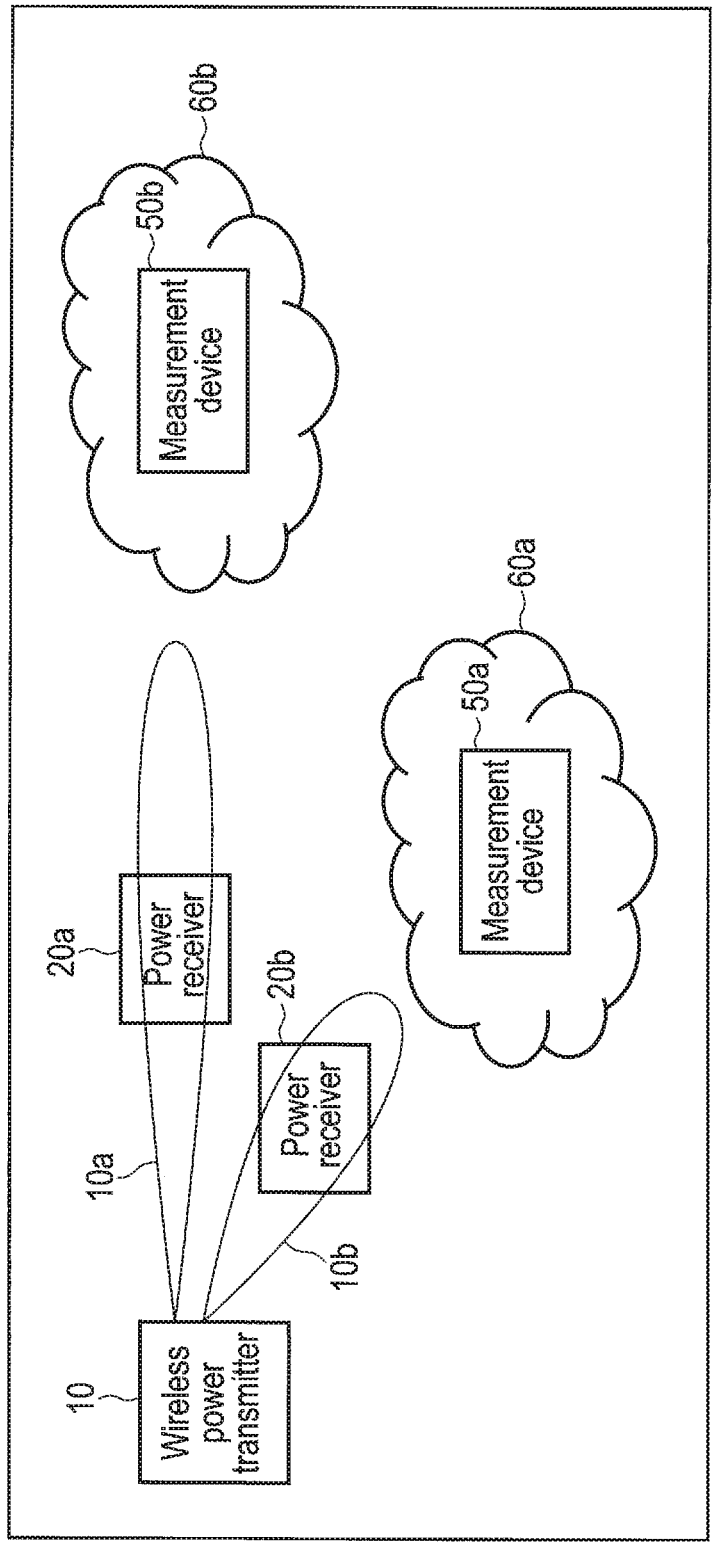
FIG. 11 is a diagram for describing a wireless power transmission system according to a second embodiment.

As shown in FIG. 11, for example, when the measurement device 50*b* is disposed in the direction of the power receiver 20*a* and other wireless communication systems are detected by the measurement device 50*b* (that is, the feedback information of the measurement device 50*b* is received in the wireless power transmitter 10), it is possible to control the electromagnetic wave 10*a* transmitted to the power receiver 20*a* based on the feedback information of the measurement device 50*b* and the position information of the measurement device 50*b*. In addition, as shown in FIG. 11, for example, when the measurement device 50*a* is disposed in the direction of the power receiver 20*b* and other wireless communication systems are detected by the measurement device 50*a* (that is, the feedback information of the measurement device 50*a* is received in the wireless power transmitter 10), it is possible to control the electromagnetic wave 10*b* transmitted to the power receiver 20*b* based on the feedback information of the measurement device 50*a* and the position information of the measurement device 50*a*.

Here, it is described that the feedback information of the measurement device 50b is used for controlling the electromagnetic wave 10a transmitted to the power receiver 20a, and the feedback information of the measurement device 50a is used for controlling the electromagnetic wave 10b transmitted to the power receiver 20b, but for example, the electromagnetic wave 10a or 10b may be controlled based on the feedback information of the measurement devices 50a and 50b and the positional relationship between the measurement devices 50a and 50b.

In addition, for example, one beam-like electromagnetic wave capable of transmitting power to both the power receivers 20a and 20b may be controlled based on the feedback information of the measurement devices 50a and 50b and the positional relationship between the measurement devices 50a and 50b.

In FIG. 12, it is described that other wireless communication systems are detected by each of the measurement devices 50a and 50b, but for example, when the other wireless communication systems are detected by only one of the measurement devices 50a and 50b, only the feedback information of the measurement device detecting other wireless communication systems may be transmitted to the wireless power transmitter 10.

As described above, in the second embodiment, for example, the measurement devices including the measurement device 50a communicably connected to the wireless power transmitter 10 and the measurement device 50b which is not communicably connected to the wireless power transmitter 10 but is communicably connected to the measurement device 50a are disposed. According to this configuration, compared to the above-described first embodiment, other wireless communication systems can be detected by monitoring a wider range, thereby making it possible to more reliably avoid the interference of the electromagnetic wave for power supply with other wireless communication systems.

In the second embodiment, it has been described that the measurement device 50a is communicably connected to the wireless power transmitter 10 and the measurement device 50b is not communicably connected to the wireless power transmitter 10, but the measurement device 50a may not be communicably connected to die wireless power transmitter 10 and the measurement device 50b may be communicably connected to the wireless power transmitter 10. In addition, each of the measurement devices 50a and 50b may be communicably connected to the wireless power transmitter 10.

That is, in the second embodiment, at least one of the measurement devices may be communicably connected to the wireless power transmitter 10.

Here, as described above, the detection module 101 included in the wireless power transmitter 10 can detect the existence of other wireless communication systems by monitoring the wireless signal. The wireless power transmitter 10 transmits power by the electromagnetic wave and at the same time the detection module 101 may monitor the wireless signal, or the power transmission and the monitoring of the wireless signal are alternately performed. When the power transmission and the monitoring of the wireless signal are performed at the same time, signal separation (isolation) for performing the transmission processing and the reception processing in parallel is required, and the circuit scale becomes large. When the power transmission and the monitoring of the wireless signal are alternatively performed, the time required for the power transmission is shortened and the efficiency is deteriorated.

Therefore, in the case in which the measurement devices 50a and 50b are disposed as described above, for example, the measurement device 50a (including the detection module 501) functions as the detection module 101 included in the wireless power transmitter 10, and the wireless power transmitter 10 may be configured so as not to include the detection function (detection module 101). According to such a configuration, the processing load in the wireless power transmitter 10 can be reduced, and the efficient power transmission can be realized.

Third Embodiment

Next, a third embodiment will be described. In the third embodiment, parts similar to drawings used in the description of the above-described first embodiment are denoted by the same reference numerals. In addition, in the following description, parts different from the above-described first embodiment will be mainly described.

A positional relationship between a wireless power transmitter 10, wireless communication devices 40a to 40c, and a measurement device 50 according to the third embodiment is as shown in FIG. 2 as described above, for example. In addition, a hardware configuration and a functional configuration of the wireless power transmitter 10 according to the third embodiment are the same as those of the above-described first embodiment, and therefore a detailed description thereof will be omitted herein. In addition, a hardware configuration of the measurement device 50 according to the third embodiment is the same as that of the above-described first embodiment, and therefore a detailed description thereof will be omitted herein.

Figure 13:
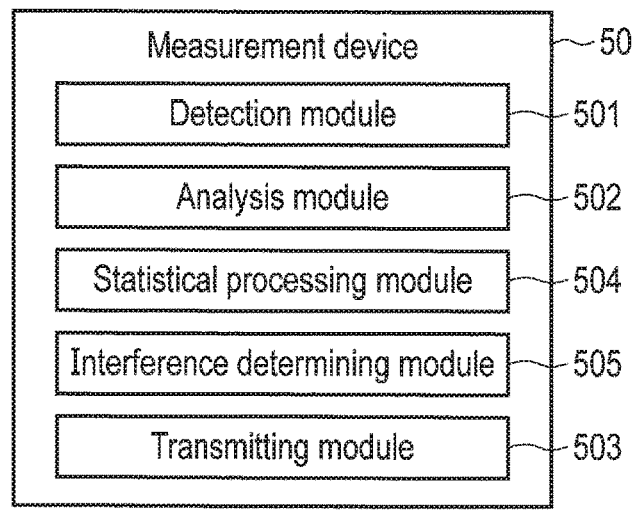
FIG. 13 is a block diagram showing an example of a functional configuration of a measurement device according to a third embodiment.

FIG. 13 is a block diagram showing an example of a functional configuration of the measurement device 50 according to the third embodiment. As shown in FIG. 13, the measurement device 50 includes a statistical processing module 504 and an interference determining module 505 in addition to the detection module 501, the analysis module 502, and the transmitting module 503 described in the above-described first embodiment.

That is, the third embodiment is different from the above-described first embodiment in that the measurement device 50 includes the statistical processing module 504 and the interference determining module 505.

In the third embodiment, a part or the entirety of the statistical processing module 504 and the interference determining module 505 is realized by causing the above-described CPU 51 to execute a program, that is, by software. It is to be noted that a part or the entirety of each of the modules 504 and 505 may be realized by an integrated circuit (IC), dedicated hardware, or the like or may be realized by a combined configuration of software and hardware.

The statistical processing module 504 executes statistical processing on information on a wireless signal analyzed by the analysis module 502. Details of the statistical processing executed by the statistical processing module 504 will be described later.

Based on the result of the statistical processing performed by the statistical processing module 504, the interference determining module 505 determines whether interference is caused due to the electromagnetic wave, for example at a position of the measurement device 50, when the wireless power transmitter 10 transmits power by the electromagnetic wave.

In the third embodiment, the transmitting module 503 transmits feedback information to the wireless power transmitter 10 when it is determined by the interference determining module 505 that the interference due to the electromagnetic wave occurs.

Next, an example of a processing procedure of the wireless power transmitter 10 and the measurement device 50 (wireless power transmission system) according to the third embodiment will be described with reference to a sequence chart of FIG. 14.

Here, it is assumed that there are other wireless communication systems within a detectable range of the measurement device 50, and the wireless signals in the wireless communication systems are received (detected) by the measurement device 50.

In addition, in the third embodiment, the measurement device 50 can detect a state in which the wireless power transmitter 10 does not transmit power by the electromagnetic wave (that is, the electromagnetic wave is not transmitted) and a state in which the wireless power transmitter 10 transmits power by the electromagnetic wave (that is, the electromagnetic wave is transmitted). In the following description, for convenience, the state in which the wireless power transmitter 10 does not transmit power by the electromagnetic wave is referred to as a non-power supply state, and the state in which the wireless power transmitter 10 transmits power by the electromagnetic wave is referred to as a power supply state.

It should be noted that the non-power supply state and the power supply state may be detected, for example, by notifying the measurement device 50 of whether the wireless power transmitter 10 transmits the electromagnetic wave from the wireless power transmitter 10, or may be detected depending on whether the electromagnetic wave transmitted from the wireless power transmitter 10 is received by the measurement device 50.

Here, it is assumed that the measurement device 50 can detect the non-power supply state and the power supply state by notifying the measurement device 50 of whether the electromagnetic wave is transmitted by the wireless power transmitter 10.

First, it is assumed that the wireless power transmitter 10 is in the non-power supply state. In this case, the wireless power transmitter 10 notifies the measurement device 50 that the wireless power transmitter 10 is in the non-power supply state (step S21).

When the processing in step S21 is executed, the measurement device 50 can detect that the wireless power transmitter 10 is in the non-power supply state (step S22).

Here, if it is assumed that other wireless communication systems exist within the detectable range of the measurement device 50 (that is, the existence of the other wireless communication systems is detected by the detection module 501) as described above, the analysis module 502 collects wireless signals in the other wireless communication systems, for example, in a predetermined period, and analyzes the collected wireless signals (step S23). In step S23, the analysis module 502 analyzes a signal strength of each of the collected wireless signals, for example.

Next, the statistical processing module 504 executes statistical processing on the result analyzed in step S22. In this case, the statistical processing module 504 generates a histogram (hereinafter, referred to as a histogram for the non-power supplying period) representing communication situations (communication situations in other wireless communication systems) based on the wireless signal analyzed by the analysis module 502 (step S24).

Figure 15:
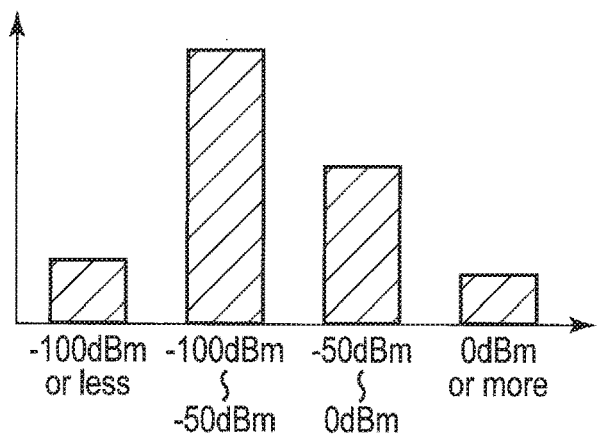
FIG. 15 is a diagram showing an example of a histogram for a non-power supplying period.

Here, FIG. 15 shows an example of a histogram for the non-power supplying period generated in step S24. The histogram for the non-power supplying period shown in FIG. 15 represents the communication situation (first communication situation) of other wireless communication systems based on the wireless signal measured (analyzed) by the measurement device 50 for the non-power supplying period. Specifically, in the example shown in FIG. 15, the histogram for the non-power supplying period represents the number (frequency) of wireless signals analyzed in step S23 for each signal strength of the wireless signals. In addition, "dBm" shown in FIG. 15 is a unit in the signal strength (RSSI) of the wireless signal.

Referring back to FIG. 14, the histogram for the non-power supplying period generated in step S24 is stored in the measurement device 50 (for example, the nonvolatile memory 52 or the like) (step S25).

Here, it is assumed that power transmission (that is, power supplying) by the electromagnetic waves for power supply is started in the wireless power transmitter 10 (step S26).

In this case, the wireless power transmitter 10 notifies the measurement device 50 that the wireless power transmitter 10 is in the power supply state (step S27).

When the processing in step S27 is executed, the measurement device 50 can detect that the wireless power transmitter 10 is in the power supply state (step S28).

Here, if it is assumed that other wireless communication systems exist within the detectable range of the measurement device 50 (that is, the existence of the other wireless communication systems is detected by the detection module 501) as described above, the analysis module 502 collects wireless signals in the other wireless communication systems, for example, in a predetermined period, and analyzes the collected wireless signals (step S29). The processing in step S29 is processing corresponding to the above-described step S23, and the analysis module 502 analyzes the signal strength of each of the collected wireless signals, for example.

Next, the statistical processing module 504 executes statistical processing on the result analyzed in step S29. In this case, the statistical processing module 504 generates the histogram (hereinafter, referred to as the histogram for the power supplying period) representing the communication situations (communication situations in other wireless communication systems) based on the wireless signal analyzed by the analysis module 502, for example (step S30).

Figure 16:
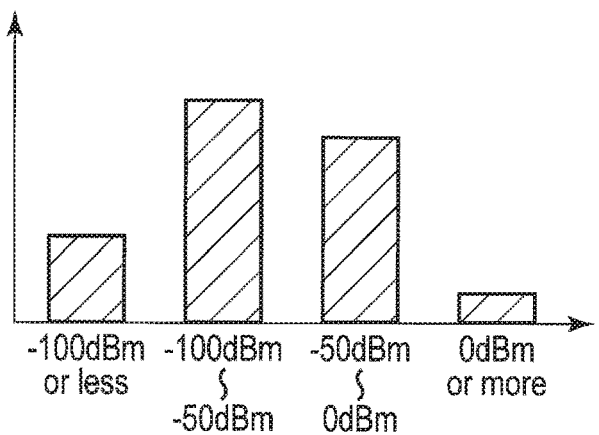
FIG. 16 is a diagram showing an example of a histogram for a power supplying period.

FIG. 16 shows an example of the histogram for the power supplying period generated in step S30. The histogram for the power supplying period shown in FIG. 16 represents the communication situation (second communication situation) or other wireless communication systems based on the wireless signal measured (analyzed) by the measurement device 50 for the power supplying period. Specifically, the example shown in FIG. 16, the histogram for the power supplying period represents the number (frequency) of wireless signals analyzed in step S29 for each signal strength of the wireless signals.

Referring back to FIG. 14, the interference determining module 505 compares the histogram for the non-power supplying period stored in step S25 with the histogram for the power supplying period generated in step S30 to determine whether the interference occurs due to the electromagnetic wave for power supply which the wireless power transmitter 10 transmits (step S31).

In the third embodiment, it is assumed that the phrase "the interference is occurring" includes the case in which the influence of the interference due to the electromagnetic wave for power supply is increased to the extent that the communication situations in other wireless communication systems is deteriorated. In addition, it is assumed that the phrase "the interference does not occur" includes not only the case in which there is no interference due to the electromagnetic wave for power supply but also the case in which the influence of interference is reduced to the extent that the communication situations in other wireless communication systems is not deteriorated.

In step S31, for example, when the distribution of the number of wireless signals for each signal strength represented by each histogram (histogram for the non-power supplying period and histogram for the power supplying period) is the same or similar, it is determined that the interference due to the electromagnetic waves for power supply for the non-power supplying period and the power supplying period is reduced and thus the interference does not occur due to the electromagnetic wave.

On the other hand, for example, when the distribution of the number of wireless signals for each signal strength represented by each histogram is not the same or not similar, it is determined that the influence due to the electromagnetic wave for power supply is increased for the non-power supplying period and the power supplying period and thus the interference occurs due to the electromagnetic wave.

Here, describing in detail the processing in step S31 with reference to FIGS. 15 and 16 as described above, the number of wireless signals for each signal strength in the histogram for the non-power supplying period shown in FIG. 15 is reduced in the order of "−100 dBm to −50 dBm", "−50 dBm to 0 dBm", "−100 dBm or less", and "0 dBm or more".

On the other hand, in the histogram for the power supplying period shown in FIG. 16, the number of wireless signals for each signal strength is reduced in the order of "−100 dBm to −50 dBm", "−50 dBm to 0 dBm", "−100 dBm or less", "0 dBm or more".

Comparing the histogram for the non-power supplying period shown in FIG. 15 with the histogram for the power supplying period shown in FIG. 16, although the number of wireless signals at each signal strength is different, the order (that is, the distribution patterns of the wireless signals for each signal strength in each histogram) of the number of wireless signals of each signal strength is the same. In this case, it is determined that the interference does not occur due to the electromagnetic wave for power supply in step S31.

Figure 17:
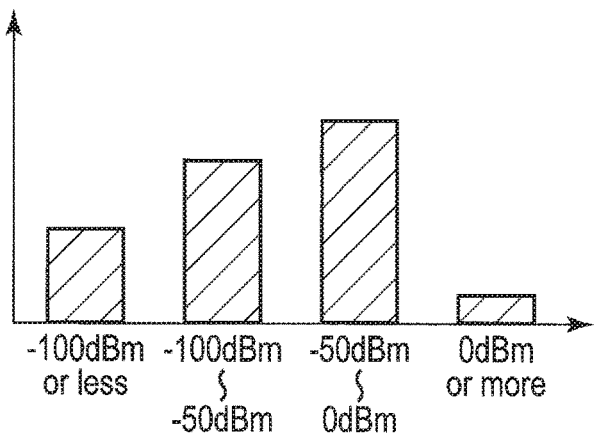
FIG. 17 is a diagram showing another example of a histogram for the power supplying period.

On the other hand, it is assumed that the histogram for the power supplying period is as shown in FIG. 17. In this case, in the histogram for the power supplying period shown in FIG. 17, the number of wireless signals for each signal strength is reduced in the order of "−50 dBm to −0 dBm", "−100 dBm to −50 dBm", "−100 dBm or less", "0 dBm or more".

Comparing the histogram for the non-power supplying period shown in FIG. 15 with the histogram for the power supplying period shown in FIG. 17, the order (that is, the distribution patterns of the wireless signals for each signal strength in each histogram) of the number of wireless signals of each signal strength is different. In this case, it is determined that the interference occurs due to the electromagnetic wave for power supply in step S31.

It should be noted that the process of step S31 described herein is an example. For example, the degree of similarity between the histogram for the non-power supplying period and the histogram for the power supplying period may be calculated based on the difference in the number of wireless signals for each signal strength, and it may be determined whether the interference occurs due to the electromagnetic wave for power supply based on the degree of similarity.

Referring back to FIG. 14, if it is determined in step S31 that the interference occurs due to the electromagnetic wave for power supply, the transmitting module 503 transmits the feedback information to the wireless power transmitter 10 (step S32). Since the feedback information transmitted to the wireless power transmitter 10 in step S32 is the same as that described in the first embodiment as described above, a detailed description thereof will be omitted herein. It should be noted that the feedback information in the third embodiment may include, for example, the histogram for the above-described power supplying period, the information obtained from the histogram, or the like.

When the processing in step S32 is executed, the control module 105 included in the wireless power transmitter 10 controls the electromagnetic wave for power supply transmitted from the wireless power transmitter 10 based on the feedback information transmitted in step S32 and the position information of the measurement device 50 stored in the database 102 (step S33). The processing in step S33 is processing corresponding to the processing in steps S4 and S5 shown in FIG. 7 as described above, and therefore a detailed description thereof will be omitted herein.

On the other hand, if it is determined in step S31 that the interference does not occur due to the electromagnetic wave for power supply, the processing after step S32 is not executed. In this case, for example, similar to the case where the existence of other wireless communication systems is not detected in the measurement device 50 described in the first embodiment, the electromagnetic wave for power supply is transmitted at a power level corresponding to an extent that the interference distance does not exceed the detectable range of the measurement device 50.

Figure 14:
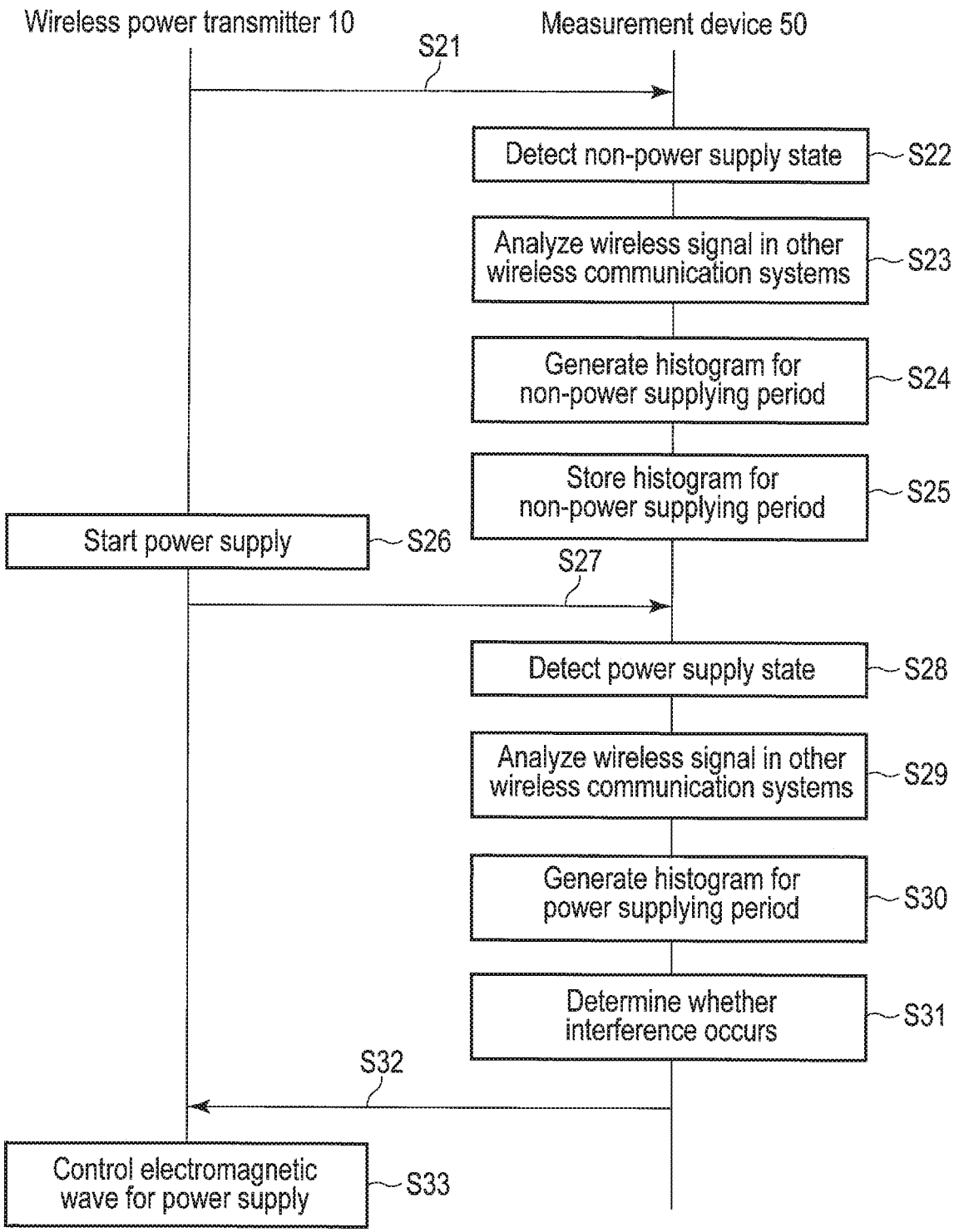
FIG. 14 is a sequence chart showing an example of a processing procedure of the wireless power transmission system.

According to the processing shown in FIG. 14 as described above, the wireless power transmitter 10 can control the electromagnetic wave for power supply depending on the difference between the communication situation based on the wireless signal measured (analyzed) by the measurement device 50 for the power supplying period and the communication situation based on the wireless signal measured (analyzed) by the measurement device 50 for the non-power supplying period.

In FIG. 14, the processing in steps S21 to S33 have been described as a series of processing, but for example, when the wireless power transmitter 10 is in the non-power supply state, the processing in steps S21 to S25 may be executed in advance. That is, the processing of steps S21 to S25 and the processing of steps S26 to S33 may be independently executed.

As described above, in the third embodiment, the electromagnetic wave for power supply is controlled depending on the difference between the communication situation (first communication situation) in the non-power supplying period and the communication situation (second communication situation) in the power supplying period. According to this, for example, even when the existence or other wireless communication systems is detected in the measurement device 50, when it is determined that the interference does not occur due to the electromagnetic wave for power supply (that is, the difference in the communication situations for the non-power supplying period and the power supplying period is reduced and the influence of interference by the electromagnetic wave is reduced), it is possible to transmit the electromagnetic wave for power supply without lowering the power level, for example. Therefore, the efficient power transmission can be realized.

It should be noted that in steps S24 and S30 shown in FIG. 14, the histogram is generated for each frequency channel, and in step S31, it may be determined whether the interference occurs for each frequency channel. With such a configuration, it becomes possible to discriminate the frequency channel in which the interference occurs, and it is possible to transmit the electromagnetic wave for power supply while avoiding the frequency channel in which the interference occurs.

In addition, the third embodiment describes that as the statistical processing, the processing of generating the histogram representing the communication situation for the non-power supplying period and the histogram representing the communication situation for the power supplying period is executed, but if it can be determined whether the interference occurs depending on the difference between the communication situation for the non-power supplying period and the communication situation for the power supplying period, another statistical processing may be executed.

Furthermore, the third embodiment describes that the processing shown in FIG. 14 is executed, but a part or the processing executed in the measurement device 50 shown in FIG. 14 may be executed in the wireless power transmitter 10. Specifically, for example, the processing in steps S24, S25, S30, S31 and the like shown in FIG. 14 can be executed in the wireless power transmitter 10.

According to at least one embodiment described above, the electronic apparatus, the measurement apparatus, and the measurement method capable of avoiding the interference with other wireless communication systems can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus communicably connected to first and second measurement apparatuses which are provided separately from a power receiver, the electronic apparatus comprising:
   a power supplier configured to supply power by a first electromagnetic wave; and
   control circuitry configured to:
      receive first information on a first wireless signal detected by the first measurement apparatus, wherein the first wireless signal may include the first electromagnetic wave;
      receive second information on a second wireless signal detected by the second measurement apparatus, wherein the second wireless signal may include the first electromagnetic wave; and
      control a second electromagnetic wave for power supply to the power receiver, based on the first information, the second information, a first position of the first measurement apparatus, and a second position of the second measurement apparatus, to control both a first intensity of the second electromagnetic wave detected at the first position of the first measurement apparatus and a second intensity of the second electromagnetic wave detected at the second position of the second measurement apparatus.

2. The electronic apparatus according to claim 1, wherein:
   the control circuitry is configured to receive the first and second information from the first and second measurement apparatuses located at the first and second positions, the first and second positions being a first distance and a second distance away from the electronic apparatus, respectively, and
   the first and second distances are determined according to respective detectable distances of the first and second wireless signals.

3. The electronic apparatus according to claim 1, wherein:
   the first and second wireless signals include a wireless signal transmitted from a wireless communication device different from the electronic apparatus and the first and second measurement apparatuses, and
   the control circuitry is configured to:
      receive the first and second information from the first and second measurement apparatuses located at the first and second positions, the first and second positions being positions closer to the electronic apparatus than the wireless communication device; and
      control the second electromagnetic wave so that a first distance from the electronic apparatus at which the second electromagnetic wave causes interference when the power is transmitted by the second electromagnetic wave is a distance shorter than a second distance from the electronic apparatus to each of the first and second measurement apparatuses.

4. The electronic apparatus according to claim 1, wherein:
   the first and second wireless signals include a wireless signal transmitted from a wireless communication device different from the electronic apparatus and the first and second measurement apparatuses, and
   the control circuitry is configured to:
      receive the first and second information from the first and second measurement apparatuses located at the first and second positions, the first and second positions being positions farther away from the electronic apparatus than the wireless communication device; and
      control the second electromagnetic wave such that a first distance from the electronic apparatus at which the second electromagnetic wave causes interference when the power is transmitted by the second electromagnetic wave is a distance shorter than a fourth distance obtained by subtracting a third distance at which the wireless signal is measurable by each of the first and second measurement apparatuses from a second distance from the electronic apparatus to each of the first and second measurement apparatuses.

5. The electronic apparatus according to claim 1, wherein the control circuitry is configured to control the second electromagnetic wave depending on a difference between a first communication situation based on the wireless signal measured by each of the first and second measurement apparatuses for a first period in which the power is not transmitted by the second electromagnetic wave and a second communication situation based on the wireless signal measured by each of the first and second measurement apparatuses for a second period in which the power is transmitted by the second electromagnetic wave.

6. The electronic apparatus according to claim 1, wherein the control circuitry is configured to:

receive a position after at least one of the first and second measurement apparatuses is moved if the position of the at least one of the first and second measurement apparatuses is moved; and control the second electromagnetic wave based on the received position.

7. The electronic apparatus according to claim 1, wherein each of the first and second information is transmitted from a respective one of the first and second measurement apparatuses to the electronic apparatus according to a predetermined communication scheme in which the first and second information do not interfere with the first and second wireless signals.

8. A measurement apparatus communicably connected to an electronic apparatus which supplies power to a power receiver, the measurement apparatus being provided separately from the power receiver, and the measurement apparatus comprising control circuitry configured to:

detect a wireless signal, wherein the wireless signal may include a first electromagnetic wave for power supply; and transmit first information on the detected wireless signal to the electronic apparatus, wherein a second electromagnetic wave for power supply to the power receiver is controlled based on the first information, second information transmitted from another measurement apparatus, a first position of the measurement apparatus, and a second position of the another measurement apparatus, to control both a first intensity of the second electromagnetic wave detected at the first position of the measurement apparatus and a second intensity of the second electromagnetic wave detected at the position of the another measurement apparatus.

9. A method executed by an electronic apparatus communicably connected to first and second measurement apparatuses which are provided separately from a power receiver, the method comprising:

supplying power by a first electromagnetic wave;

receiving first information on a first wireless signal detected by the first measurement apparatus, wherein the first wireless signal may include the first electromagnetic wave;

receiving second information on a second wireless signal detected by the second measurement apparatus, wherein the second wireless signal may include the first electromagnetic wave; and controlling a second electromagnetic wave for power supply to the power receiver, based on the first information, the second information, a first position of the first measurement apparatus, and a second position of the second measurement apparatus, to control both a first intensity of the second electromagnetic wave detected at the first position of the first measurement apparatus and a second intensity of the second electromagnetic wave detected at the second position of the second measurement apparatus.

10. The method according to claim 9, wherein:

the receiving comprises receiving the first and second information from the first and second measurement apparatuses located at the first and second positions, the first and second positions being a first distance and a second distance away from the electronic apparatus, respectively, and the first and second distances are determined according to respective detectable distances of the first and second wireless signals.

11. The method according to claim 9, wherein:

the first and second wireless signals include a wireless signal transmitted from a wireless communication device different from the electronic apparatus and the first and second measurement apparatuses, the receiving comprises receiving the first and second information from the first and second measurement apparatuses located at the first and second positions, the first and second positions being positions closer to the electronic apparatus than the wireless communication device, and the controlling comprises controlling the second electromagnetic wave such that a first distance from the electronic apparatus at which the second electromagnetic wave causes interference when the power is transmitted by the second electromagnetic wave is a distance shorter than a second distance from the electronic apparatus to each of the first and second measurement apparatuses.

12. The method according to claim 9, wherein:

the first and second wireless signals include a wireless signal transmitted from a wireless communication device different from the electronic apparatus and the first and second measurement apparatuses, the receiving comprises receiving the first and second information from the first and second measurement apparatuses located at the first and second positions, the first and second positions being positions farther away from the electronic apparatus than the wireless communication device, and the controlling comprises controlling the second electromagnetic wave such that a first distance from the electronic apparatus at which the second electromagnetic wave causes interference when the power is transmitted by the second electromagnetic wave is a distance shorter than a fourth distance obtained by subtracting a third distance at which the wireless signal is measurable by each of the first and second measurement apparatuses from a second distance from the electronic apparatus to each of the first and second measurement apparatuses.

13. The method according to claim 9, wherein the controlling comprises controlling the second electromagnetic wave depending on a difference between a first communication situation based on the wireless signal measured by each of the first and second measurement apparatuses for a first period in which the power is not transmitted by the second electromagnetic wave and a second communication situation based on the wireless signal measured by each of the first and second measurement apparatuses for a second period in which the power is transmitted by the second electromagnetic wave.

14. The method according to claim 9, wherein the receiving comprises receiving a position after at least one of the first and second measurement apparatuses is moved, if the position of the at least one of the first and second measurement apparatuses is moved, and the controlling comprises controlling the second electromagnetic wave based on the received position.

15. The method according to claim 9, wherein each of the first and second information is transmitted from a respective one of the first and second measurement apparatuses to the electronic apparatus according to a predetermined communication scheme in which the first and second information do not interfere with the first and second wireless signals.

16. An electronic apparatus communicably connected to first and second measurement apparatuses which are provided separately from a power receiver, the electronic apparatus comprising:
   a power supplier configured to supply power by a first electromagnetic wave for power supply; and
   control circuitry configured to:
      receive first information on a first wireless signal detected by the first measurement apparatus, wherein the first wireless signal may include the first electromagnetic wave;
      receive second information on a second wireless signal detected by the second measurement apparatus, wherein the second wireless signal may include the first electromagnetic wave; and
      control a second electromagnetic wave for power supply to the power receiver, based on the first information, the second information, a first position of the first measurement apparatus, and a second position of the second measurement apparatus to suppress both a first intensity of the second electromagnetic wave detected at the first position of the first measurement apparatus and a second intensity of the second electromagnetic wave detected at the second position of the second measurement apparatus.

* * * * *